June 19, 1962 G. M. BOYD 3,039,769

NAVIGATION RECREATION TOY DEVICE

Filed Jan. 23, 1961 3 Sheets-Sheet 1

INVENTOR.
GEORGE M. BOYD
BY Zoltan H. Polachek
ATTORNEY.

NAVIGATION RECREATION TOY DEVICE

Filed Jan. 23, 1961 3 Sheets-Sheet 2

INVENTOR.
GEORGE M. BOYD
BY Zoltan H. Polachek
ATTORNEY.

June 19, 1962 G. M. BOYD 3,039,769

NAVIGATION RECREATION TOY DEVICE

Filed Jan. 23, 1961 3 Sheets-Sheet 3

INVENTOR.
GEORGE M. BOYD
BY
Zoltan H. Polachek
ATTORNEY 3,039,769
NAVIGATION RECREATION TOY DEVICE
George M. Boyd, P.O. 408 Grand Ave., Leonia, N.J.
Filed Jan. 23, 1961, Ser. No. 84,094
10 Claims. (Cl. 273—1)

This invention concerns a space travel game.

A principal object of the invention is to provide a recreational medium employing space age language and environment.

Another object is to acquaint players with problems and methods of solution of space navigation.

A further object is to provide an educational and entertaining game promoting space-minded thinking, interest in space travel, research and exploration.

According to the invention there is provided a destination selector device herein designated as an "astroputer." The astroputer has a transparent dial ruled with a compass rose, and a plurality of transparent pointers rotatable on the dial and settable to specified compass positions. The dial is also ruled with spaced meridian or sidereal hour lines. A plurality of space position or "fix" cards are provided, on which are listed a plurality of specified stars, space ports, planets, etc. The cards are marked with fix positions or settings to be made of the several pointers on the dial. The players of the game set the pointers to the indicated settings and then place the astroputer upon a star chart provided with the game. The star chart is marked with the fix positions on the cards as well as destinations determined by the fix positions. A mileage chart is provided to which the players refer for finding the mileage traveled from one location in space to another. The players list the mileage traveled from one space location to another on a log. The position cards may be marked with penalties, scientific information, and other useful data. The player traveling the most mileage according to his log in a round of play wins the round.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figure 1:
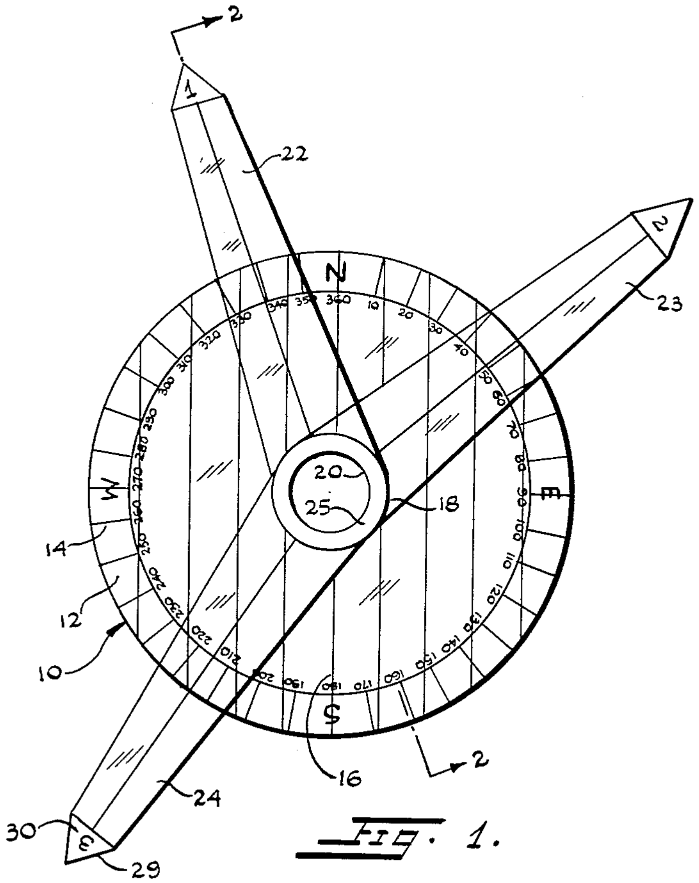
FIG. 1 is a plan view of a position selector employed in the game.
Figure 2:
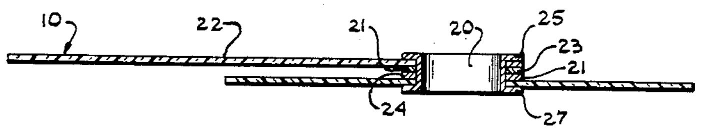
FIG. 2 is a sectional view taken on line 2—2 of FIG. 1.

Referring to FIGS. 1 and 2, there is shown a position selector 10 comprising a circular transparent plastic dial 12 having marked therein in 10° divisions a 360° compass rose 14. Also marked on the dial are spaced, straight parallel lines 16 drawn parallel to the N (north) and S (south) positions on the dial.

Figure 7:
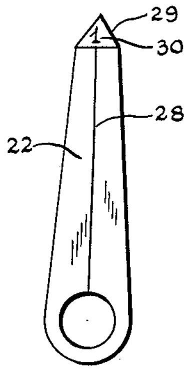
FIG. 7 is a plan view of a pointer.

At the center of the dial is an annular metal eyelet 18 having a central opening 20. The eyelet engages annular ends 21 of three transparent plastic pointers 22–24; see FIGS. 1, 2 and 7. The ends of the pointers are superimposed on one another and held by the upper annular flange 25 and lower flange 27 of the eyelet. The pointers are rotatable around the dial independently of each other and will remain in any position set on the dial. Central lines 28 are ruled on the pointers which terminate in pointed ends 29. At the pointed ends are marked numerals 30 identifying the several pointers.

Figure 3:
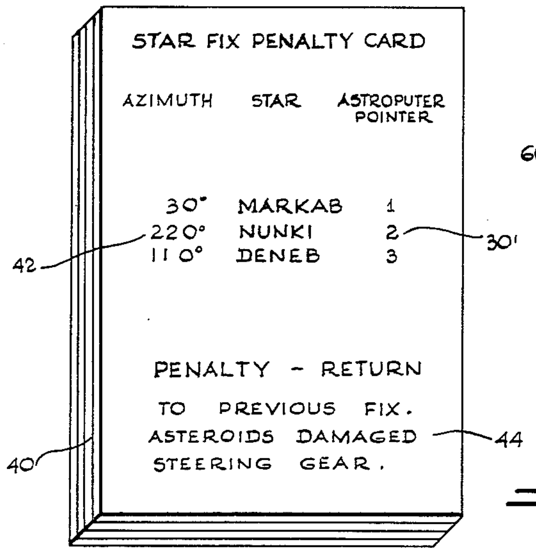
FIG. 3 is a plan view of a penalty-fix card employed in the game.

In FIG. 3 is shown a plurality of penalty-fix cards 40 provided in the game. The cards are marked with names of stars, azimuth positions 42, and respective pointer numbers 30' collectively representing a specified space journey. At the bottom of the card is a legend 44 indicating a penality, or inscribed with educational or pertinent scientific information. All of the cards 40 will have different listings of stars and penalties.

Figure 4:
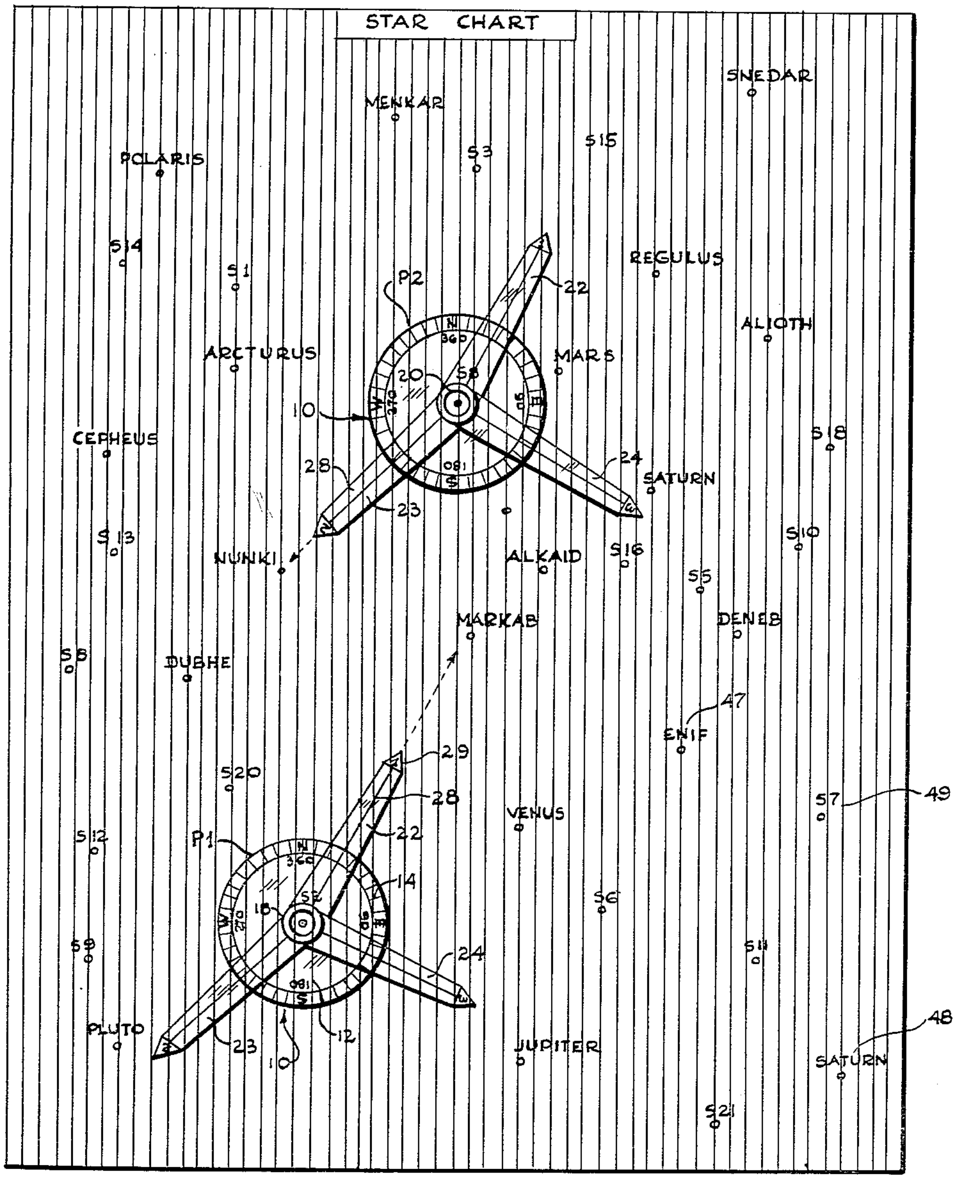
FIG. 4 is a plan view of a star chart.

FIG. 4 illustrates one of a plurality of star charts provided in the game. The card is ruled with a plurality of spaced parallel azimuth lines corresponding in spacing to the lines 16 ruled on dial 12. Also marked on the chart in predetermined positions are names of stars 47, planets 48, and space port positions 49. Each of the star charts provided in the game will be marked with different layouts of space bodies and destinations.

Figure 5:
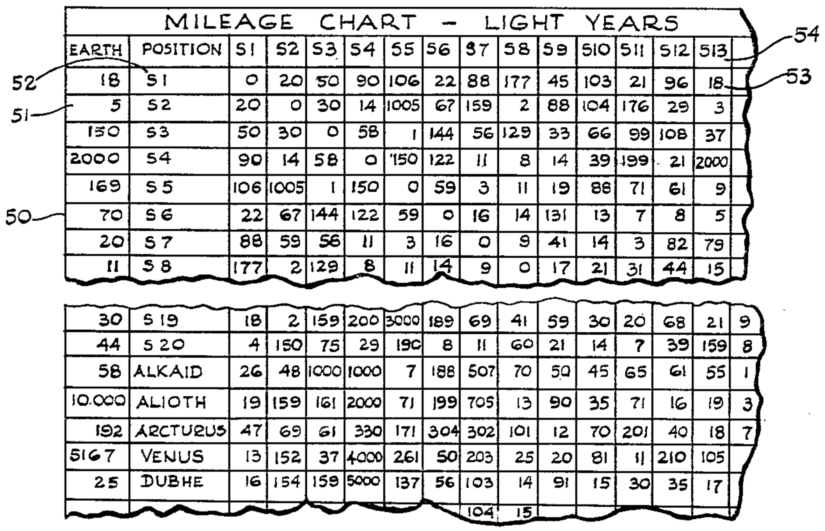
FIG. 5 is a plan view of portions of a mileage chart.

FIG. 5 shows portions of a mileage chart 50 having listed on one column 52 names of different space destinations to which a space ship might travel. Adjacent the space destination column 52 are columns 53 of mileage numbers indicating the distance from each space destination in column 52 to a space destination listed in the horizontal row 54 at the top of the card. Column 51 lists mileages from earth to the space locations of column 52.

Figure 6:
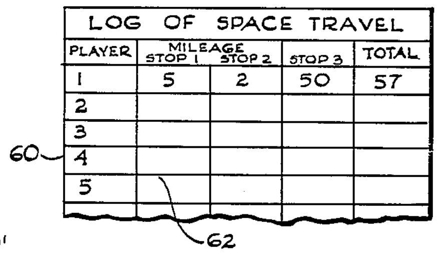
FIG. 6 is a plan view of a portion of a space travel log.

FIG. 6 shows a portion of a log or record sheet 60 kept by the players or by a scorekeeper who records in boxes 62 the mileages traveled during space journeys by each of the listed players. A "Totals" column is provided for recording the total mileage traveled during each round of play.

To play the game, the penalty-fix cards 40 are shuffled and inverted in a stack. The first player removes the topmost card 40. The other players in turn each take the top card from the stack. Suppose the first player picks a card reading as shown in FIG. 3. The first player will then set the pointer marked "1" of the position selector 10 to 30°. He will set pointer "2" to 220° and pointer "3" to 110°. With the pointers set in the specified positions, the player will lay the selector 10 on the star chart 45 shown in FIG. 4. The player will align the lines 16 on dial 12 with lines 46 on chart 45. The player will locate the selector 10 so that first pointer 22 points at the star "Markab" and a marked space destination such as a planet, star or space port appears in opening 20. In the first position P1 indicated on the chart in FIG. 4, space portion position S2 is located. The "S2" may be read through the transparent dial 12 and pointer 21. This is the first destination of the first player's "space ship" from earth. The player looks up the distance from earth to space port position S2 in column 51 of chart 50 and finds that it is five light years. This distance is marked in the log 60 where numeral "5" is recorded in the first stop column for the first player. The player then moves the selector 10 to locate the second destination.

At position P2 in FIG. 4, the second pointer 23 points to the star "Nunki" as instructed on the penalty-fix card 40. In the opening 20 of the dial now appears the second stop of the first player's space ship. This is shown to be space port S8. The player turns again to mileage chart 50 and finds that it is two light years from space port position S2 to position S8. This means that the player's space ship traveled two light years to make the second stop and numeral "2" is recorded on the log 60 as shown for the second stop. Then the player sets the selector 10 so the third pointer 24 points to the position of the star "Deneb" as instructed on the card 40 and locates his third stop which will be the star "Alkaid." Turning again to the mileage chart, the player finds that it is fifty light years from space port S8 to Alkaid and he records "50" on the log. This completes his round of travel and his total mileage is found to be fifty-seven light years as indicated on the log. The second, third and subsequent players all perform the same operations according to the instructions on their cards 40. The player having the largest mileage wins the round and the game.

To prolong the game, several rounds will be played, each player taking his turn by selecting a new penalty-fix card and starting his new turn from the last destination or fix at which he arrived in the previous round. Due regard will be given to penalties indicated on the cards. Thus the player holding the card shown in FIG. 3 on starting a new round will have to return to his second stop, at space port S8, losing the fifty light years he gained in the third leg of his trip from space port S8 to the star Alkaid.

The star charts will be so laid out that only one space destination will be provided for each fix, and the player must find the particular azimuth line 46 on chart 45 which yields a destination in opening 20 while the particular pointer is pointing directly at the designated star used in making the fix. If desired, the penalty-fix cards could require that a fix be set up with two or even three pointers pointing to two or three different space locations. Also, more than one star chart could be provided with the space locations laid out differently on each chart, and with each player having a different star chart assigned to him. Also, different mileage charts could be used, with mileages differently stated on each chart. This variety of charts would lend interest to the game since chances would be reduced of traveling the same mileage twice in making a space journal instructed on a penalty-fix.

While the invention has been explained with reference to space travel among stars, planets and space ports, it is possible to arrange the game so that it is limited to air travel on earth. The mileage chart 45 would then indicate distances between different geographical locations on earth. The chart 45 would be an earth map. Appropriate geographical locations would be specified on the penalty-fix cards 40 to outline an air journey on earth. The log 60 would be kept in the same manner as explained above and the position selector 10 would be used in the same way.

Games arranged according to the invention would be both entertaining and educational. They could be made in simple form with few charts or in elaborate form with many charts, and even with a plurality of position selectors or astroputers. By providing each player with his own astroputer and charts, each player would perform his own space journey simultaneously with the other players who would be working on their own charts and making their own journeys. This would speed up the game and increase interest among the players. Also, it would make it possible for more players to engage in the game simultaneously.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends; a star chart having marked thereon a plurality of space destinations including stars, planets and space ports; a mileage chart indicating distances between the space destinations on the star chart; and penalty-fix cards, each of the cards indicating a journey in space of a player's space ship by a listing of space positions to be located on the star chart by said pointers.

2. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends; a star chart having marked thereon a plurality of space destinations including stars, planets and space ports; a mileage chart indicating distances between the space destinations on the star chart; and penalty-fix cards, each of the cards indicating a journey in space of a player's space ship by a listing of space positions to be located on the star chart by said pointers, said space destinations on the star chart being so located that a particular space destination appears at said opening in the dial when a particular pointer points at a space destination designated on one of the cards.

3. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends; a start chart having marked thereon a plurality of space destinations including stars, planets and space ports; a mileage chart indicating distances between the space destinations on the star chart; and penalty-fix cards, each of the cards indicating a journey in space of a player's space ship by a listing of space positions to be located on the star chart by said pointers, said star chart being ruled with a plurality of parallel azimuth lines corresponding in spacing to the ruled lines on the dial, said space destinations on the start chart being so located that a particular space destination appears at said opening in the dial when a particular pointer points at a space destination designated on one of the cards.

4. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends; a star chart having marked thereon a plurality of space destinations including stars, planets and space ports; a mileage chart indicating distances between the space destinations on the star chart; and penalty-fix cards, each of the cards indicating a journey in space of a player's space ship by a listing of space positions to be located on the star chart by said pointers, said star chart being ruled with a plurality of parallel azimuth lines corresponding in spacing to the ruled lines on the dial, said space destinations on the star chart being so located that a particular space destination appears at said opening in the dial when a particular pointer points at a space destination designated on one of the cards, there being a log provided for recording distances traveled between space destinations in each space journey by each player's space ship.

5. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends, a plurality of space location charts, each chart having marked thereon a plurality of space destinations, a plurality of mileage charts, each mileage chart indicating distances between space destinations on the space location charts, and penalty-fix cards, each of the cards indicating a journey in space of a player's space vehicle by a listing of space positions to be located on the space location charts by said pointers.

6. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends, a plurality of space location charts, each chart having marked thereon a plurality of space destinations, a plurality of mileage charts, each mileage chart indicating distances between space destinations on the space location charts, and penalty-fix cards, each of the cards indicating a journey in space of a player's space vehicle by a listing of space positions to be located on the space location charts by said pointers, there being a log provided for recording distances traveled between space destinations in each space journey by each player's space vehicle.

7. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends, a plurality of space location charts, each chart having marked thereon a plurality of space destinations, a plurality of mileage charts, each mileage chart indicating distances between space destinations on the space location charts, and penalty-fix cards, each of the cards indicating a journey in space of a player's space vehicle by a listing of space positions to be located on the space location charts by said pointers, there being a log provided for recording distances traveled between space destinations in each space journey by each player's space vehicle, said space location charts being ruled with parallel lines corresponding in spacing to the ruled lines on the dial, said space destinations on the space location charts being so located that a particular space destination appears at said opening in the dial when a particular pointer points at a space destination designated on one of the cards.

8. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends, a plurality of space location charts, each chart having marked thereon a plurality of space destinations, a plurality of mileage charts, each mileage chart indicating distances between space destinations on the space location charts, and penalty-fix cards, each of the cards indicating a journey in space of a player's space vehicle by a listing of space positions to be located on the space location charts by said pointers, there being a log provided for recording distances traveled between space destinations in each space journey by each player's space vehicle, said space location charts being ruled with parallel lines corresponding in spacing to the ruled lines on the dial, said space destinations on the space location charts being so located that a particular space destination appears at said opening in the dial when a particular pointer points at a space destination designated on one of the cards, each of said space location charts being a map of an area, each of said space destinations being a geographical location on the map.

9. A space travel game, comprising a space position selector including a circular transparent dial, and a plurality of transparent pointers rotatably mounted on the dial around a circular eyelet defining a central opening in the dial, said dial being marked with a compass rose and ruled with spaced lines parallel to the north-south direction of the compass rose, said pointers having central lines and pointed ends, a plurality of space location charts, each chart having marked thereon a plurality of space destinations, a plurality of mileage charts, each mileage chart indicating distances between space destinations on the space location charts, and penalty-fix cards, each of the cards indicating a journey in space of a player's space vehicle by a listing of space positions to be located on the space location charts by said pointers, there being a log provided for recording distances traveled between space destinations in each space journey by each player's space vehicle, said space location charts being ruled with parallel lines corresponding in spacing to the ruled lines on the dial, said space destinations on the space location charts being so located that a particular space destination appears at said opening in the dial when a particular pointer points at a space destination designated on one of the cards, each of said cards bearing an instruction of a penalty affecting the space journey and scientific information pertinent to the space journey.

10. A space travel game, comprising a space position selector including a circular transparent dial, and a plurality of transparent pointers rotatably mounted on the dial around a circular eyelet defining a central opening in the dial, said dial being marked with a compas rose and ruled with spaced lines parallel to the north-south direction of the compass rose, said pointers having central lines and pointed ends; a star chart having marked thereon a plurality of space destinations including stars, planets and space ports; a mileage chart indicating distances between the space destinations on the star chart; and penalty-fix cards, each of the cards indicating a journey in space of a player's space ship by a listing of space positions to be located on the star chart by said pointers, said star chart being ruled with a plurality of parallel azimuth lines corresponding in spacing to the ruled lines on the dial, said space destination on the star chart being so located that a partciular space destination appears at said opening in the dial when a particular pointer points at a space destination designated on one of the cards, there being a log provided for recording distances traveled between space destinations in each space journey by each player's space ship, each of said cards being an instruction of a penalty affecting the space journey and scientific information pertinent to the space journey.

References Cited in the file of this patent

UNITED STATES PATENTS

| | | |
|---|---|---|
| 1,371,285 | Wilbur | Mar. 15, 1921 |
| 1,401,446 | Rude | Dec. 27, 1921 |
| 1,653,464 | Lomas | Dec. 20, 1927 |
| 2,018,038 | Steinberg | Oct. 22, 1935 |